(12) United States Patent
Andrassy et al.

(10) Patent No.: US 10,606,956 B2
(45) Date of Patent: Mar. 31, 2020

(54) SEMANTIC TEXTUAL SIMILARITY SYSTEM

(71) Applicant: Siemens Aktiengesellschaft, München (DE)

(72) Inventors: Bernt Andrassy, München (DE); Pankaj Gupta, München (DE)

(73) Assignee: SIEMENS AKTIENGESELLSCHAFT (DE)

( * ) Notice: Subject to any disclaimer, the term of this patent is extended or adjusted under 35 U.S.C. 154(b) by 97 days.

(21) Appl. No.: 15/993,893

(22) Filed: May 31, 2018

(65) Prior Publication Data

US 2019/0370332 A1 Dec. 5, 2019

(51) Int. Cl.
| | | |
|---|---|---|
| *G06F 17/00* | (2019.01) | |
| *G06F 17/27* | (2006.01) | |
| *G06N 3/04* | (2006.01) | |
| *G06F 16/33* | (2019.01) | |
| *G06F 16/31* | (2019.01) | |

(52) U.S. Cl.
CPC ........ *G06F 17/2785* (2013.01); *G06F 16/313* (2019.01); *G06F 16/33* (2019.01); *G06N 3/04* (2013.01)

(58) Field of Classification Search
CPC .......................... G06F 17/278; G06F 17/2785
See application file for complete search history.

(56) References Cited

U.S. PATENT DOCUMENTS

| | | | | |
|---|---|---|---|---|
| 8,065,307 | B2 * | 11/2011 | Haslam | G06F 16/93 707/738 |
| 2005/0060643 | A1 * | 3/2005 | Glass | G06F 17/241 715/205 |
| 2015/0269932 | A1 * | 9/2015 | Evanini . | G10L 15/1822 704/235 |
| 2016/0055196 | A1 * | 2/2016 | Collins | G06F 17/2211 707/690 |

* cited by examiner

*Primary Examiner* — Daniel Abebe
(74) *Attorney, Agent, or Firm* — Schmeiser, Olsen & Watts LLP

(57) ABSTRACT

A Semantic Textual Similarity System comprising a first Long Short Term Memory, LSTM, branch adapted to be operative, to determine text similarity, on a first text corpus, the first text corpus comprising a plurality of first text elements; wherein each first text element has a first number of distinct subdivisions. The system also comprises a second LSTM branch adapted to be operative, to determine text similarity, on a second text corpus, the second text corpus comprising a plurality of second text elements, wherein each second text element has a second number of distinct subdivisions.

11 Claims, 2 Drawing Sheets

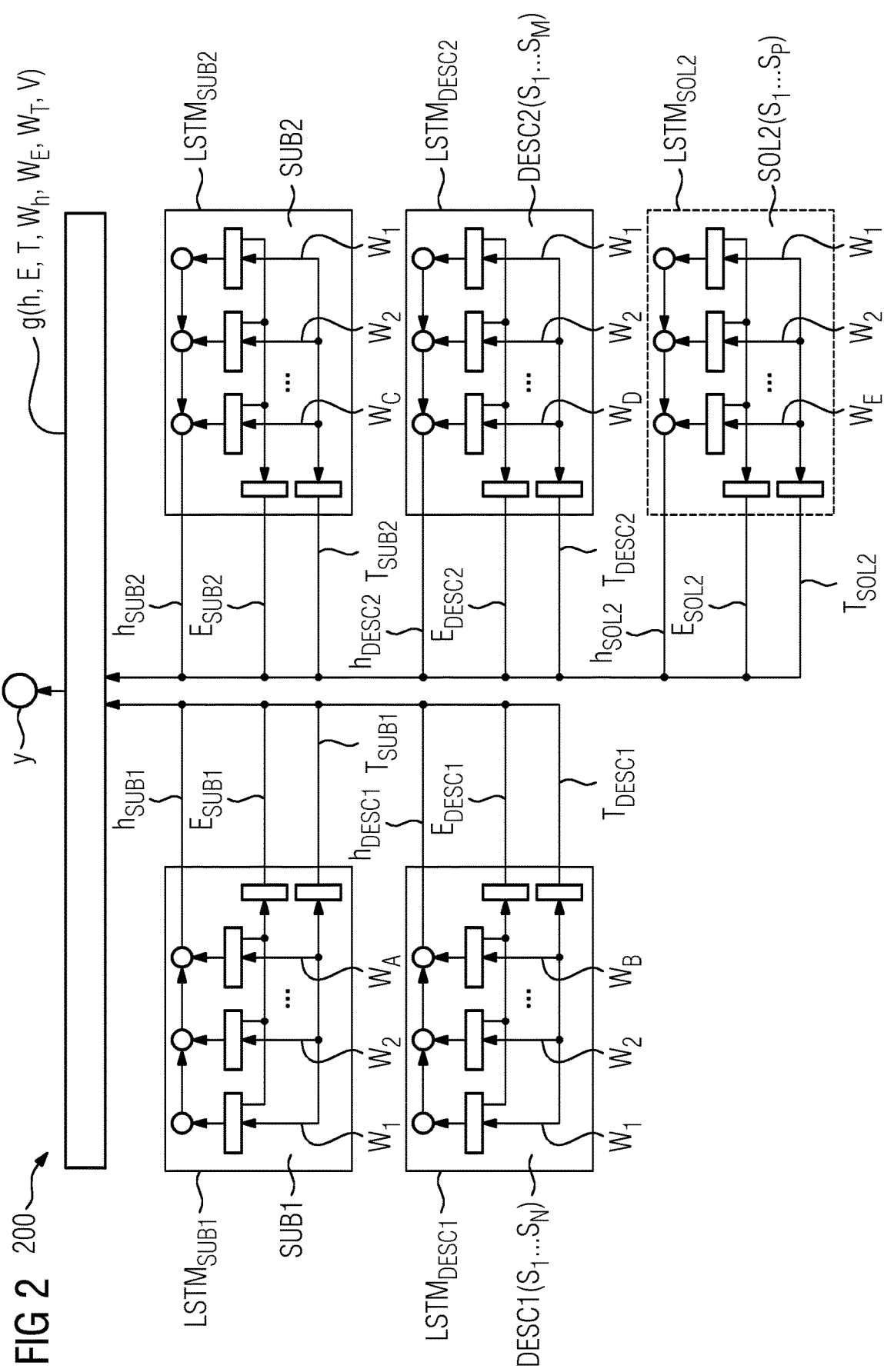

SEMANTIC TEXTUAL SIMILARITY SYSTEM

FIELD OF TECHNOLOGY

Figure 1:
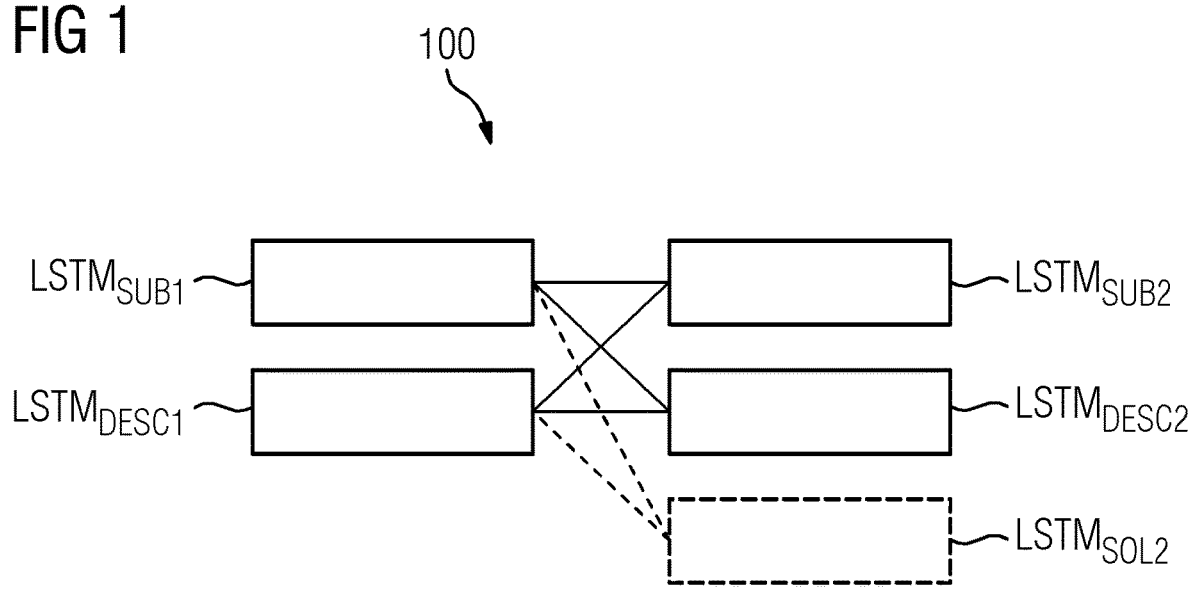

Present invention concerns a Semantic Textual Similarity System.

BACKGROUND

Digital handling of texts like Natural Language Processing, e.g. Information Retrieval or text understanding, often is based on semantic analysis of text, in particular of semantic similarity. Machine learning and/or deep learning may be used for such tasks. Systems for semantic text analysis may be referred to as Semantic Textual Similarity Systems. Long Short Term Memory (LSTM) arrangements, a specific form of Recurring Neural Networks (RNNs) have been found to be useful in such systems, which can also be considered deep learning or machine learning systems. In one approach of text analysis, it may be attempted to identify text elements in a text corpus that are similar to an input text element based on similarity learning performed on a first text corpus of texts comparable, e.g. in structure and/or content, to the input text element, and a second text corpus with associated text elements.

SUMMARY

It is an advantage of the embodiments of the invention to provide improved approaches for a semantic textual similarity system, in particular in terms of reliable learning similarity utilising LSTM.

Accordingly, there is disclosed a Semantic Textual Similarity (STS) System. The system comprises a first Long Short Term Memory, LSTM, branch adapted to be operative, to determine text similarity, on a first text corpus comprising a plurality of first text elements, wherein each first text element has a first number of distinct subdivisions. The system also comprises a second LSTM branch adapted to be operative, to determine text similarity, on a second text corpus, the second text corpus comprising a plurality of second text elements, wherein each second text element has a second number of distinct subdivisions. The first LSTM branch comprises for each of the first number of distinct subdivisions a first branch LSTM level. Each first branch LSTM level is adapted to be operative, for each of the first text elements, on an associated subdivision of the first text element utilising first weights to determine a hidden state vector associated to the first branch LSTM level. Each first weight is associated to a subelement of a subdivision of a first text element. The second LSTM branch comprises for each of the second number of distinct subdivisions a second branch LSTM level. Each second branch LSTM level is adapted to be operative, for each of the second text elements, on an associated subdivision utilising a plurality of second weights to determine a hidden state vector associated to the second branch LSTM level. Each second weight is associated to a subelement of a subdivision of a second text element.

The first weights and second weights are shared between the first LSTM branch and the second LSTM branch for iteratively determining similarity between first text elements and second text elements based on hidden state vectors. By sharing the weights between the levels, it is possible to improve the similarity determination in particular for text elements having distinct subdivisions with highly different structures.

In particular, a first LSTM branch level may be adapted to determine a hidden state vector based on second weights, e.g. due to the weights being shared. Alternatively, or additionally, a second LSTM branch level may be adapted to determine a hidden state vector based on first weights. This allows the system to provide improved context and similarity determination between the distinct subdivisions. All branch levels may be adapted accordingly.

In particular, it may be considered that a first LSTM branch level is adapted to determine a hidden state vector based on second weights from more than one second LSTM branch level, in particular from all second LSTM branch levels. Alternatively, or additionally, it may be considered that a second LSTM branch level is adapted to determine a hidden state vector based on first weights from more than one first LSTM branch level, in particular all first LSTM branch levels. Such cross-level sharing allows improved determination of similarity even between very differently worded subdivisions.

It may be considered that the first number of subdivisions is smaller than the second number subdivisions, such that the branches may have different numbers of levels. Accordingly, differently structured text elements may be treated. In some cases, the first number may be 2, and the second number may be 3.

A subdivision of a first text element and/or a second text element may consist of one sentence or phrase, e.g. a title or short description. Further subdivisions may be longer. Thus, asymmetric text elements and/or subdivisions may be handled.

It may be considered that each level of the first LSTM branch is connected to each level of the second LSTM branch for sharing weights. Connection between levels may be via suitable interfaces allowing communication, in particular sharing of weights.

In general, the first and the second LSTM branches may be connected to a topic model, which may for example for learning latent representation of text elements, and/or for retrieval, and/or for evaluating similarity. Connection may be via suitable interfaces, e.g. for each level to a topic model. Example topic models are Latent Dirichlet Allocation (LDA) models, Replicated Softmax (RSM), or Document Neural Autoregressive Distribution Estimator (DOCNADE), or a model based on DOCNADE.

The system may in general be adapted to determine similarity between an input text element and a second text element based on learning performed on the first text corpus and the second text corpus. The learning may be performed using the LSTM branches. In general, the learning may provide a structured space for representing pairs of first and second text elements based on a similarity measure or score, which may be based on multi-level and/or cross-level and/or asymmetric text similarities. In general, multi-level may pertain to subdivisions of first and second elements of the same level, and cross-level of different levels. Asymmetric may pertain to differences in text length of subdivisions, e.g. number of words and/or sentences. Subdivisions may be considered asymmetric if their average lengths differ by a factor of at least 2, or at least 3, or at least 5. It may be considered that the system is adapted for retrieving for an input text element, e.g. a query, a set of one or more second text elements having the largest similarity.

The system may be adapted to evaluate similarity between first text elements and second text elements based on a plurality of channels. A channel may provide a similarity measure or metric, e.g. based on a topic model, a sum-average approach and/or hidden vectors of LSTM branches and/or levels. A generalised similarity metric based on the plurality of channels and/or associated metrics or measures may be utilised.

It may be considered that the system is adapted to evaluate similarity between first text elements and second text elements based on a Manhattan metric, which may be a generalised similarity metric. This facilitates reliable similarity measurement.

In some variants, the first text elements may be queries for an industrial ticket system, and the second text elements may represent a set of solutions for queried problems. It may be considered that the second text elements represent historical tickets with solutions. The approaches allow in particular reliable retrieval of known solutions to historical queries for new queries. An input text may be a query without solution.

The system may be implemented in hardware and/or software and/or firmware, e.g. formulated as a computer program product (non-transitory computer readable storage medium having instructions, which when executed by a processor, perform actions) with instructions causing processing circuitry to carry out and/or control the functionality of the system. The above described system may comprise a computer system. A method comprising the functional actions the system is adapted for may be considered, as well as a computer program comprising instructions causing a computer and/or processing circuitry to carry out and/or control a corresponding method. Also, a storage medium storing such a program is proposed.

It may be considered that the system comprises individual modules or subsystems for representing individual functionality, e.g. a LSTM module for each LSTM level of each branch, and/or associated topic model module/s and/or metric module/s and/or sum-average module/s. A module generally may be implemented in software. Alternatively, or additionally, it may be considered that the system comprises and/or utilises integrated circuitry, in particular processing circuitry, for providing the functionalities. Integrated circuitry or processing circuity may comprise one or more processors, e.g. microprocessor/s, and/or FPGAs (Field Programmable Gate Array) and/or ASICs (Application Specific Integrated Circuitry) and/or microcontrollers. The circuitry may comprise, and/or be connected or connectable to, memory, e.g. transient and/or volatile and/or nonvolatile memory. Examples of memory comprise RAM (Random Access Memory), ROM (Read-Only Memory), cache memory, buffer memory, optical memory or magnetic memory. The system may be centralised or distributed, e.g. with different functionalities associated to different modules or units, e.g. communicating via suitable interfaces like communication interfaces or software interfaces.

In general, a topic model and/or topical features determined thereon may be considered when computing similarity in asymmetric texts, along with semantic representations obtained from LSTM structures. In particular, similarity may be determined based on the topic model and/or a topic representation determined based on the topic model. LDA and DocNADE variants may be employed to compute topical features, which may extract abstract or summarized text or ticket representations. Jointly learning pairwisesimilarity in tickets or texts exploiting latent/hidden text representation and topical features together is proposed.

BRIEF DESCRIPTION

The above-described properties, features and advantages of present invention as well as the way they are achieved will be made clearer and better understandable in the light of the following discussion, making reference to exemplary embodiments shown in accompanying figures, in which FIG. 1 shows an exemplary LSTM level structure;
FIG. 2 shows an exemplary STS system.

DETAILED DESCRIPTION

In the following, examples are explained in the context of an Industrial Ticketing System. In such systems, queries q are filed identifying technical issues to be fixed. A query may comprise distinct subdivisions, in particular a subject (SUB) and a description (DESC). In a knowledge base, there are stored historical tickets t, which comprise as distinct subdivisions subject (SUB) and description (DESC) similar to a query, as well as a description of a solution (SOL). The historical tickets t may be considered resolved queries. There may be u queries $q_1 \ldots q_u$ in a set of queries, which may be in a query base, and v historical tickets $t_1 \ldots t_v$, wherein u and v may be different. In general, subdivisions may be distinguished by a name, label or reference, and/or text structure, and/or style, and/or format. The queries may be considered examples of first text elements, the set of queries a first text corpus. The historical tickets may be considered examples of second text elements, the set of historical tickets may be considered an example of a second text corpus. Reference to the first text corpus may be labelled "1", and references to the second text corpus may be labelled "2". Thus, a first text element may comprise the subdivisions (SUB1, DESC1), a second text element (SUB2, DESC2, SOL2). The sizes of the subdivisions of text elements may be different. In particular, SUB may be a short text, e.g. a sentence or phrase, indicating a problem and/or topic. A SOL or DESC may be significantly longer than the SUB. Often, the terminology in SUB and DESC may be closely related to each other, whereas a SOL, while being topically related to SUB and/or DESC, may be written using deviating terminology, e.g. due to being written by a technician solving the problem identified by another person in the SUB and DESC of a ticket. Other text elements may be used, which may have different structures and/or styles, which analogously may comprise differently sized subdivisions and/or different number of subdivisions of text elements of different corpi. A subelement of a text element and/or subdivision may be a sentence, or phrase, or in particular a word. Elements of the same corpus may be considered to have the same structure of subdivisions, such that e.g. each first text element may have a SUB1 and DESC1, and each second text element may have a SUB2, DESC2 and SOL2, or be treated as such. Text elements of different corpi may have different structure, in particular different numbers of subdivision. To a subdivision, a level may be associated. Subdivisions of text elements of different corpi having similar structural meaning or function (e.g., subject indication, or description) may be considered of a similar level.

FIG. 1 shows an exemplary LSTM structure 100 with two branches, which may be referred to as dual branch arrangement. One branch is associated to the first text corpus and labelled 1, the other to the second text corpus labelled 2. The first branch comprises for each subdivision of associated first text elements a LSTM module, in this example $LSTM_{SUB1}$ and $LSTM_{DESC1}$. The second branch comprises for each subdivision of associated second text elements a LSTM module, in this example $LSTM_{SUB2}$, $LSTM_{DESC2}$ and $LSTM_{SOL2}$. As can be seen, the text elements associated to the different (two) branches are structurally and stylistically distinct and different. Each subdivision or associated module represents one level of the associated branch. To a level of one branch there may be associated, e.g. topically or structurally, a level of the other branch, such that $LSTM_{SUB1}$ is associated to $LSTM_{SUB2}$, $LSTM_{DESC1}$ is associated to $LSTM_{DESC2}$. There may be cross-level association, e.g. $LSTM_{SUB1}$ to $LSTM_{DESC2}$ and/or $LSTM_{SOL2}$, and/or $LSTM_{DESC1}$ to $LSTM_{SUB2}$ and/or $LSTM_{SOL2}$.

The LSTM branch arrangement may be implemented as a Siamese LSTM, which may have tied weights and an objective function, e.g. g( ) as described below as equation (1):

$$g(h,E,T,W_h,W_E,W_T,V) = \exp(-\Sigma_{p\in\{SUB1,DESC1\}}\Sigma_{q\in\{SUB2,DESC2,SOL2\}}V_{\{p,q\}}(W_h\|h_p-h_q\|_1+W_E\|E_p-E_q\|_1+W_T\|T_p-T_q\|_1)) \quad (1)$$

Approaches described herein comprise using LSTM to learn a highly structured space representation of each pair of text elements formed from a first text element and a second text element, which may include multi-level and cross-level textual similarities, in particular asymmetric similarities.

In general, LSTM may be considered as form of Recurring Neural Network in which memory cells, respectively associated hidden vectors or hidden-state representations, are sequentially or iteratively updated. There may be utilised a memory state $c_t$ and three gates controlling flow of information over time or iteration steps. In particular, there may be an input gate $i_t$ controlling how much of an input $x_t$ is to be stored in memory, an output gate $o_t$ may control how much of $c_t$ should be exposed to the next node of the LSTM level, and a forget gate ft may determine what should be forgotten. Example dynamics for a LSTM level may be described as equations (2):

$$i_t = \text{sigmoid}(W_i x_t + U_i h_{t-1})$$

$$f_t = \text{sigmoid}(W_f x_t + U_f h_{t-1})$$

$$o_t = \text{sigmoid}(W_o x_t + U_o h_{t-1})$$

$$\tilde{c}_t = \tan h(W_c x_t + U_c h_{t-1})$$

$$c_t = i_t \odot \tilde{c}_t + f_t \odot c_{t-1}$$

$$h_t = o_t \odot \tan h(c_t)$$

Each LSTM level learns a mapping from a space of variable length sequences of length T, to a hidden-state vector h, wherein each sequence may be extracted from the corresponding subdivision of a text element, and may comprise one or more subelements like words or phrases. Each text element may of the corpi may undergo LSTM. A sequence may in particular represent a sentence or half-sentence. Each sequence or sentence with elements or words $(w_1, \ldots, w_t)$ of a subdivision may be passed to the associated LSTM level, which updates the hidden-state vector h according to equations (2), resulting in a final encoded extracted hidden-state vector h. W represent weights relating to input variables, U represent weights related to the hidden-state vector to be updated. Either can be shared and/or consider corresponding weights of one or more other levels. In particular, a weight, like e.g. W, may be determined based on one or more weights shared from one or more other levels, which may pertain to the same input value $x_i$, corresponding to one $w_i$. Each subdivision may comprise sentences or sequences S, which may be indexed 1 ... n, depending on the number of sequences in the subdivision. The arrangement may be referred to as replicated, due to sharing of the weights.

E in equation (1) may represent a sum-average over word embedding metric SumEMB, e.g. based on representing sentences or sequences as bag of words. For each branch level or subdivision, such a metric may be determined and consider for a generalised metric. Moreover, a topic model metric (T) may be provided for each subdivision or LSTM branch level.

The different metrics h, T and E, may be weighed with $W_h$, $W_T$, $W_E$, respectively, to enter into generalized metric g( ), which may use a $l_1$ norm. Weights V may be associated to the different levels or subdivisions. g( ) may be considered a Multi-Channel Manhattan metric.

FIG. 2 shows an exemplary STS system 200 with a first LSTM branch comprising two levels $LSTM_{SUB1}$ and $LSTM_{DESC1}$, into which sentences with elements $w_1 \ldots w_A$ and $w_1 \ldots w_B$, respectively, are input. This branch may be associated to a first text corpus, in particular to a set of queries q, which may have the subdivisions SUB1 and DESC1. A second LSTM branch comprises three levels $LSTM_{SUB2}$, $LSTM_{DESC2}$ and $LSTM_{SOL2}$, exemplarily representing historical queries t, with input sentences $w_1 \ldots w_C$, $w_1 \ldots w_D$, $w_1 \ldots w_E$. In this case it may be assumed that each SUB subdivision has one sentence only, and that for the other subdivisions the number of sentences run from $S_1$ to $S_N$, $S_1$ to $S_M$, or $S_1$ to $S_P$, respectively. A-E and M to P may vary between respective text elements. For each subdivision, a hidden-state vector h is provided, as well as a metric E and a topic model metric T. Accordingly, to each LSTM branch level, there may be associated a sum-average metric module and/or a topic model. However, in some cases, there may be a module adapted for serially or parallelly determine metrics of multiple LSTM, e.g. one topic model module and/or one sum-average metric module. The metrics associated to different LSTM branch levels are passed to a generalised metric representing similarity learning, which may represent similarity of queries with historical queries with their associated solutions. This facilitates quick and reliable information retrieval for input queries, such that the most similar historical queries y may be retrieved, improving the chances of finding a correct solution that already was implemented for an input query.

Even though present invention has been illustrated and explained in detail above with reference to the preferred embodiments, the invention is not to be construed as limited to the given examples. Variants or alternate combinations of features given in different embodiments may be derived by a subject matter expert without exceeding the scope of present invention.

The invention claimed is:

1. A semantic Textual Similarity System comprising:
   a first Long Short Term Memory, LSTM, branch adapted to be operative, to determine text similarity, on a first text corpus, the first text corpus comprising a plurality of first text elements; wherein each first text element has a first number of distinct subdivisions;
   a second LSTM branch adapted to be operative, to determine text similarity, on a second text corpus, the second text corpus comprising a plurality of second text elements, wherein each second text element ($t_1 \ldots t_v$) has a second number of distinct subdivisions;
   wherein the first LSTM branch comprises for each of the first number of distinct subdivisions a first branch LSTM level, each first branch LSTM level being adapted to be operative, for each of the first text elements, on an associated subdivision of the first text element utilising first weights to determine a hidden state vector associated to the first branch LSTM level, each first weight being associated to a subelement of a subdivision of a first text element;

wherein the second LSTM branch comprises for each of the second number of distinct subdivisions a second branch LSTM level, each second branch LSTM level being adapted to be operative, for each of the second text elements, on an associated subdivision utilising a plurality of second weights to determine a hidden state vector associated to the second branch LSTM level; each second weight being associated to a subelement of a subdivision of a second text element;

wherein the first weights and second weights are shared between the first LSTM branch and the second LSTM branch for iteratively determining similarity between first text elements and second text elements based on hidden state vectors.

2. The system according to claim 1, wherein a first LSTM branch level is adapted to determine a hidden state vector based on second weights.

3. The system according to claim 1, wherein a first LSTM branch level is adapted to determine a hidden state vector based on second weights from more than one second LSTM branch level.

4. The system according to claim 1, wherein the first number of subdivisions is smaller than the second number of subdivisions.

5. The system according to claim 1, wherein a subdivision of a first text element and/or a second text element consists of one sentence.

6. The system according to claim 1, wherein each level of the first LSTM branch is connected to each level of the second LSTM branch for sharing weights.

7. The system according to claim 1, wherein the first and the second LSTM branches are connected to a topic model.

8. The system according to claim 1, wherein the system is adapted to determine similarity between an input text element and a second text element y based on learning performed on the first text corpus and the second text corpus.

9. The system according to claim 1, wherein the system is adapted to evaluate similarity between first text elements and second text elements based on a plurality of channels.

10. The system according to claim 1, wherein the system is adapted to evaluate similarity between first text elements and second text elements based on a Manhattan metric.

11. The system according to claim 1, wherein the first text elements are queries for an industrial ticket system, and the second text elements represent a set of solutions for queried problems.

* * * * *